United States Patent
Decker

(10) Patent No.: US 10,889,369 B2
(45) Date of Patent: Jan. 12, 2021

(54) PASSIVE GUST ALLEVIATION SYSTEMS FOR AIRCRAFT DEVICES

(71) Applicant: Bell Helicopter Textron Inc., Fort Worth, TX (US)

(72) Inventor: George R. Decker, Mansfield, TX (US)

(73) Assignee: TEXTRON INNOVATIONS INC., Fort Worth, TX (US)

(*) Notice: Subject to any disclaimer, the term of this patent is extended or adjusted under 35 U.S.C. 154(b) by 309 days.

(21) Appl. No.: 16/115,919

(22) Filed: Aug. 29, 2018

(65) Prior Publication Data

US 2020/0070958 A1  Mar. 5, 2020

(51) Int. Cl.

| B64C 13/16 | (2006.01) |
| B64C 13/36 | (2006.01) |
| B64C 3/56 | (2006.01) |
| B64C 29/00 | (2006.01) |
| B64C 3/38 | (2006.01) |

(52) U.S. Cl.
CPC .............. B64C 13/16 (2013.01); B64C 3/56 (2013.01); B64C 13/36 (2013.01); B64C 3/385 (2013.01); B64C 29/0033 (2013.01)

(58) Field of Classification Search
CPC .............................. B64C 13/16; B64C 13/36
See application file for complete search history.

(56) References Cited

U.S. PATENT DOCUMENTS

| 2,720,368 | A | * | 10/1955 | Payne, Jr. | B64C 13/00 244/223 |
| 4,247,061 | A | * | 1/1981 | Kuczynski | F16F 15/02 244/17.19 |
| 4,544,118 | A | * | 10/1985 | Robinson | B64C 9/06 244/215 |
| 4,591,113 | A | * | 5/1986 | Mabey | G05D 1/0066 244/213 |
| 4,595,158 | A | * | 6/1986 | Robinson | B64C 9/02 244/99.14 |
| 4,773,620 | A | * | 9/1988 | Seidel | B64C 13/36 244/99.2 |
| 5,538,202 | A | * | 7/1996 | Thornburg | B64C 13/36 244/215 |
| 7,510,150 | B2 | * | 3/2009 | Williams | B64C 9/02 244/211 |
| 8,511,620 | B2 | * | 8/2013 | Matsuda | B64C 9/10 244/215 |
| 9,994,304 | B2 | * | 6/2018 | Ito | F15B 15/24 |

(Continued)

*Primary Examiner* — Joseph W Sanderson
(74) *Attorney, Agent, or Firm* — Patent Capital Group

(57) ABSTRACT

Described herein is an apparatus comprising an aircraft wing and a trailing edge aerodynamic surface connected to a trailing edge of the aircraft wing via a piston assembly in which the piston assembly holds the trailing edge aerodynamic surface in a neutral position relative to the aircraft wing at a constant supply pressure. The piston assembly may be implemented using a pneumatic piston or a hydraulic piston. A first end of the piston assembly may be connected to the aircraft wing and a second end of the piston assembly may be connected to the trailing edge aerodynamic surface. The piston assembly may include a pressure relief valve which may open or close, raising or lowering the aerodynamic surface, responsive to lift load on the aircraft wing.

13 Claims, 8 Drawing Sheets

WING LIFT TEMPORARILY REDUCED DURING GUST EVENT

(56) References Cited

U.S. PATENT DOCUMENTS

| | | | |
|---|---|---|---|
| 2007/0057114 A1* | 3/2007 | Boissenin | B64C 19/02 244/75.1 |
| 2007/0069070 A1* | 3/2007 | Williams | B64C 9/02 244/76 A |
| 2007/0114327 A1* | 5/2007 | Dees | B64C 13/16 244/34 R |
| 2011/0272532 A1* | 11/2011 | Matsuda | B64C 13/16 244/215 |
| 2013/0206916 A1* | 8/2013 | Kordt | B64C 9/34 244/203 |
| 2016/0096617 A1* | 4/2016 | Ito | B64C 13/505 92/51 |
| 2017/0036755 A1 | 2/2017 | Richardson, Jr. | |
| 2019/0315449 A1* | 10/2019 | Bowers | B64C 3/50 |

* cited by examiner

PASSIVE GUST ALLEVIATION SYSTEMS FOR AIRCRAFT DEVICES

TECHNICAL FIELD

This disclosure relates generally to aircraft and, more particularly, to a passive gust alleviation system for such aircraft.

BACKGROUND

Aircraft flying in turbulent air that may include wind gusts will be subjected to sudden or rapid lift, causing a bumpy ride that may be uncomfortable for passengers and undesirable for cargo. In response to this situation, aircraft are often fitted with gust alleviation systems that reduce the effects of gust loads on the aircraft by deflecting aircraft aerodynamic surfaces, including, for example, spoilers, ailerons, flaps, and/or combinations of same.

Some gust alleviation systems operate by measuring upward acceleration of an aircraft and comparing that value with the acceleration commanded by the control system. A feedback loop may add a correction signal to signals controlling the deflection of the aerodynamic surfaces in order to counteract the accelerations caused by wind gusts. In its simplest form, a gust alleviation system senses accelerations near the center of gravity of the aircraft. More advanced implementations utilize multiple sensors in the body and wings. Such gust alleviation systems may attempt not only to annul the effects of gusts on an aircraft's normal upward acceleration but also reduce the wing bending moments, which in turn reduces metal fatigue.

SUMMARY

Embodiments are shown and described herein and include an apparatus comprising an aircraft wing and a trailing edge aerodynamic surface connected to a trailing edge of the aircraft wing via a piston assembly in which the piston assembly holds the trailing edge aerodynamic surface in a neutral position relative to the aircraft wing at a constant supply pressure. The piston assembly may be implemented using a pneumatic piston or a hydraulic piston. A first end of the piston assembly may be connected to the aircraft wing and a second end of the piston assembly may be connected to the trailing edge aerodynamic surface. The piston assembly may include a pressure relief valve.

The pressure relief valve may be configured to open responsive to a lift load exerted on the wing exceeding a first threshold. Opening of the pressure relief valve may allow the trailing edge aerodynamic surface to rotate from the neutral position upward relative to the aircraft wing such that the upward rotation of the trailing edge aerodynamic surface relative to the aircraft wing reduces the lift load exerted on the wing. The pressure relief valve may be further configured to close responsive to the lift load exerted on the wing falling below the first threshold. Closing of the pressure relief valve may cause the trailing edge aerodynamic surface to rotate downward relative to the aircraft wing toward the neutral position.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
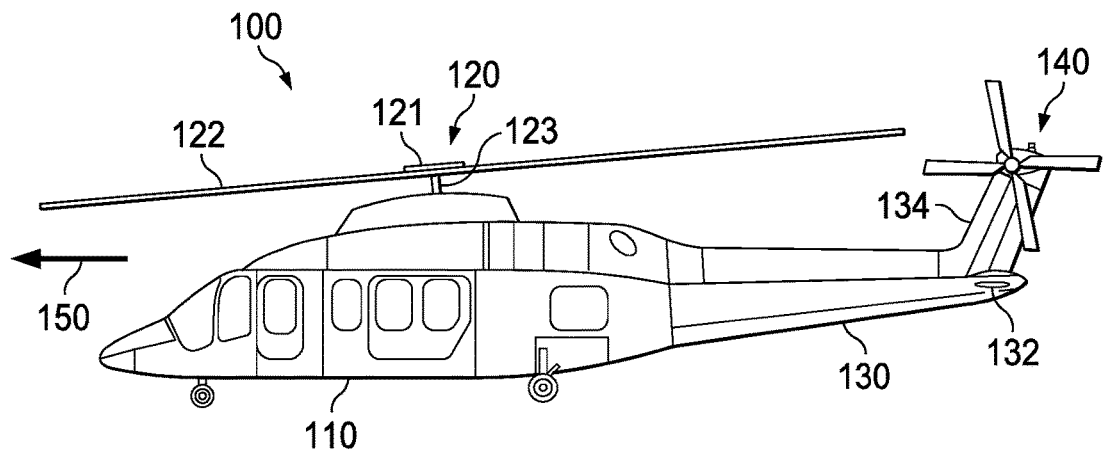
FIGS. 1A-1B and 2 illustrate example aircraft in accordance with certain embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
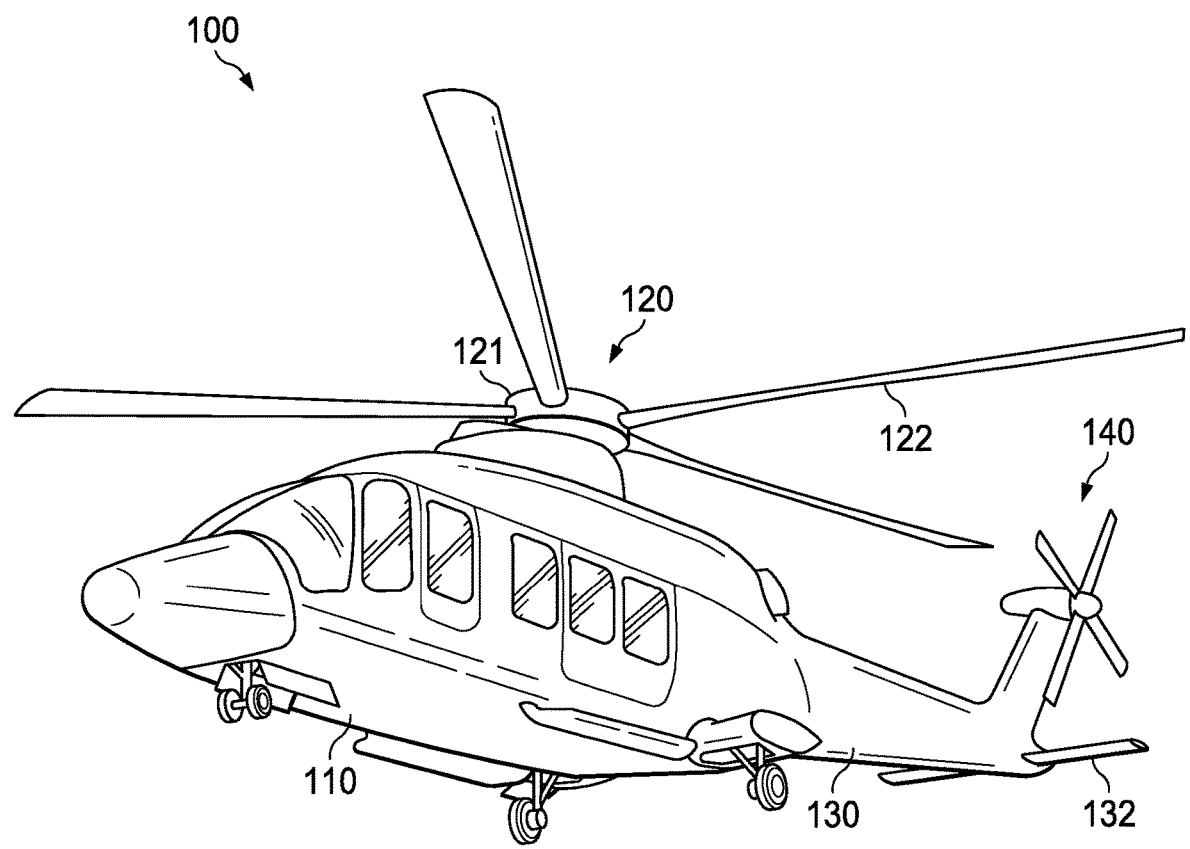

Referring to FIGS. 1A-1B, FIGS. 1A-1B illustrate an example embodiment of an aircraft, which in this example is a rotorcraft 100. FIG. 1A portrays a side view of rotorcraft 100, while FIG. 1B portrays an isometric view of rotorcraft 100. Rotorcraft 100 includes a fuselage 110, a rotor system 120, an empennage 130, and a tail rotor or anti-torque system 140. The fuselage 110 is the main body of the rotorcraft 100, which may include a cabin (e.g., for crew, passengers, and/or cargo) and/or may house certain mechanical components, electrical components, etc. (e.g., engine(s), transmission, flight controls, etc.). The rotor system 120 is used to generate lift for rotorcraft 100. For example, the rotor system 120 (also generally referred to as the "rotor") may include a rotor hub 121 (also referred to as a "rotor hub assembly" or more generally as a "hub") coupled to a plurality of rotor blades 122 (also referred to generally as "blades"). Torque generated by the engine(s) of the rotorcraft causes the rotor blades 122 to rotate, which generates lift. The rotor system 120 is supported by a mast 123. The empennage 130 of the rotorcraft 100 includes a horizontal stabilizer 132, vertical stabilizer 134, and tail rotor or anti-torque system 140. The horizontal stabilizer 132 and vertical stabilizer 134 respectively provide horizontal and vertical stability for the rotorcraft 100. Moreover, tail rotor or anti-torque system 140 may be used to provide anti-torque and/or direction control for the rotorcraft 100.

Figure 2:
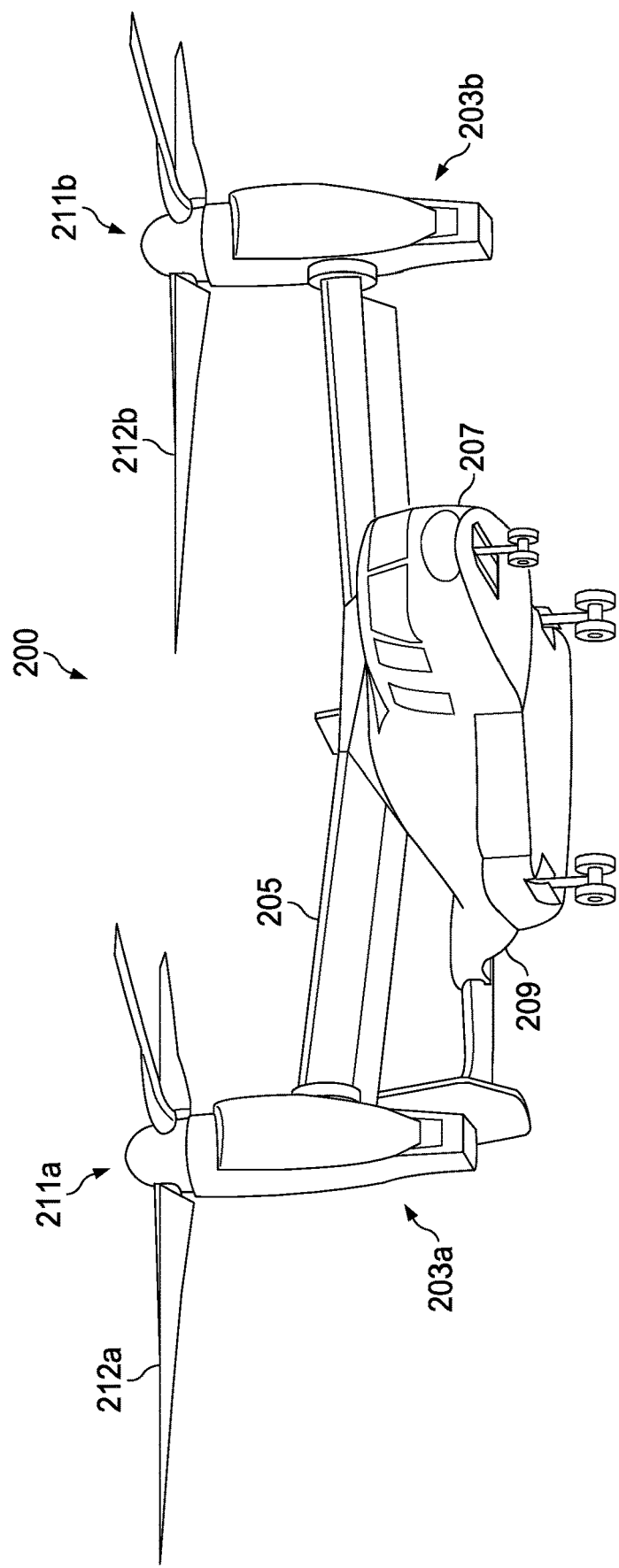

Referring to FIG. 2, FIG. 2 illustrates a perspective view of an example aircraft, which in this example is a tiltrotor aircraft 200. Tiltrotor aircraft 200 includes nacelles 203a and 203b, a wing 205, a fuselage 207, and a tail member 209. Nacelles 203a and 203b respectively include rotor systems 211a and 211b, and each rotor system includes a plurality of rotor blades 212a and 212b, respectively. Moreover, each nacelle 203a and 203b may include engine(s) and gearbox(es) for driving each rotor system 211a and 211b, respectively. In some embodiments, nacelles 203a and 203b may each be configured to rotate between a helicopter mode, in which the nacelles 203a and 203b are approximately vertical (as shown in FIG. 2), and an airplane mode, in which the nacelles 203a and 203b are approximately horizontal. In the illustrated embodiment, the tail member 209 may be used as a vertical stabilizer.

Aircraft such as rotorcraft 100 and tiltrotor aircraft 200 rely on rotor systems (e.g., rotor system 120 and tail rotor or anti-torque system 140 of rotorcraft 100) for flight capabilities, such as controlling (e.g., managing and/or adjusting) flight direction, thrust, and lift of the aircraft. Consider various examples involving rotorcraft 100, which can also be applicable to tiltrotor aircraft 200 in various embodiments. For rotorcraft 100, the pitch of each rotor blade 122 can be controlled using collective control or cyclic control to selectively control direction, thrust, and lift of the rotorcraft 100.

During collective control, all the of rotor blades 122 are collectively pitched together (e.g., the pitch angle is the same for all blades), which effects overall thrust and lift. During cyclic control, the pitch angle of each of the rotor blades 122 varies depending on where each blade is within a cycle of rotation (e.g., at some points in the rotation the pitch angle is not the same for all blades), which can affect direction of travel of the rotorcraft 100.

Aircraft such as rotorcraft 100 of FIGS. 1A-1B and tiltrotor aircraft 200 of FIG. 2 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100 of the embodiment of FIG. 1A, the most aft blade (e.g., nearest to tail rotor or anti-torque system 140) of the rotor system 120 may be pitched more nose-up and the most forward blade may be pitched more nose-down; to provide a forward direction of travel (as generally indicated by arrow 150) for rotorcraft 100.

Several types of aircraft incorporate pylons into their primary wing structure. For example, an airplane wing may incorporate a fixed pylon that includes a jet engine or propeller. In tiltrotor aircraft, pylons are typically mounted at or near the outboard ends of the wing. Each pylon, which includes a proprotor, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode. A drive system, including an engine or motor, provides rotational energy to the proprotors, and may be located in the fuselage, pylons and/or wing of the tiltrotor aircraft.

Pylons mounted on the outboard ends of a wing can limit the wingspan of the aircraft. Wing extensions may be mounted outboard of the pylons to increase the wingspan and aspect ratio of the aircraft. Wing extensions increase the efficiency of aircraft in flight, including the capability to fly at a higher altitude for longer ranges with the same fuel load.

Figure 3A:
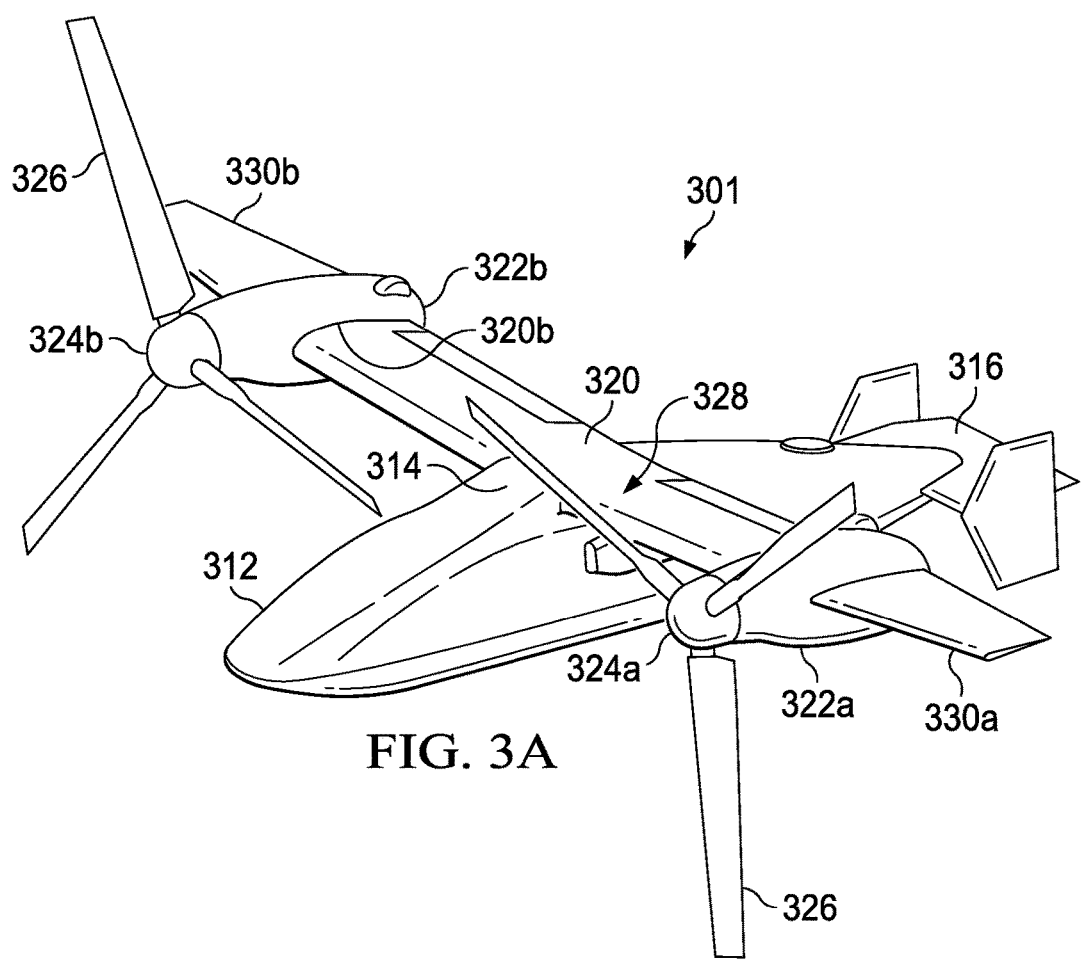
FIGS. 3A-3B are schematic illustrations of a tiltrotor aircraft having wing extensions in accordance with certain embodiments of the present disclosure.
Figure 3B:
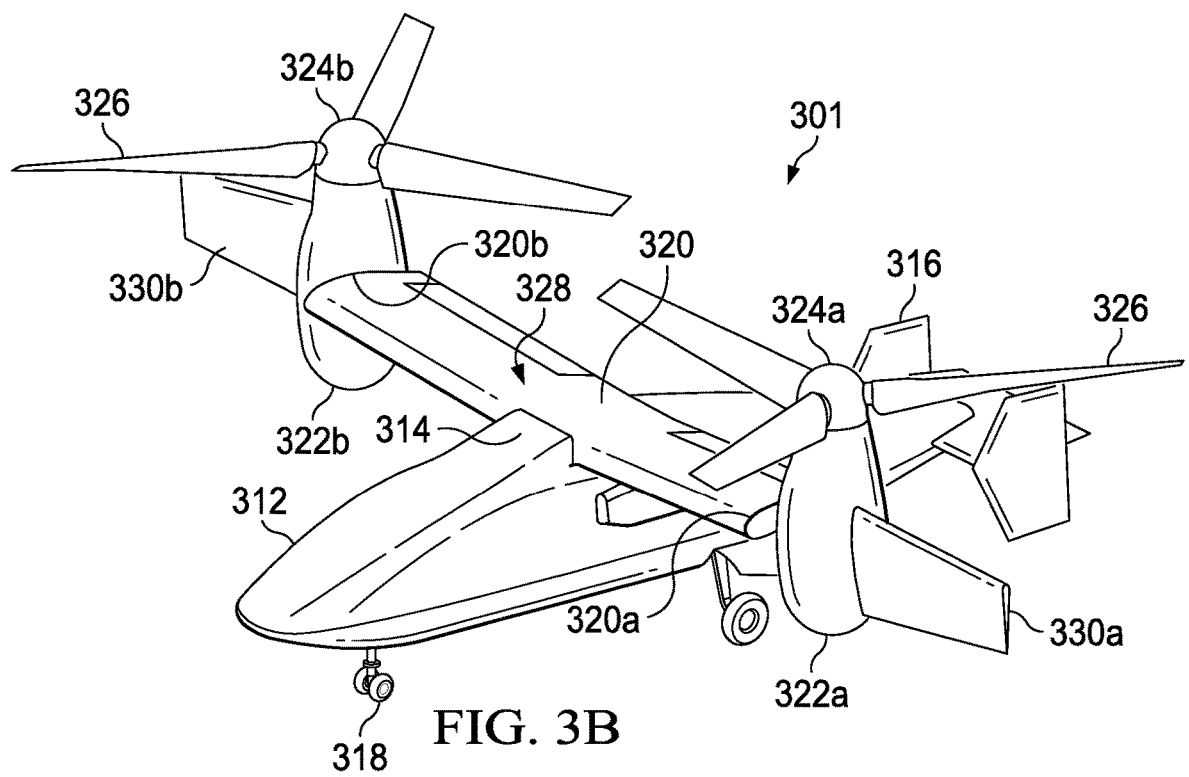

Referring now to FIGS. 3A and 3B, illustrated therein is a tiltrotor aircraft 301. The tiltrotor 301 includes a fuselage 312, a wing mount assembly 314 and a tail assembly 316. Tail assembly 316 may have aerodynamic surfaces operable for horizontal and/or vertical stabilization during flight. A landing gear system 318 provides ground support for tiltrotor aircraft 301. A wing 320 is supported by fuselage 312 and wing mount assembly 314.

Coupled to outboard ends 320a, 320b of wing 320 are pylon assemblies 322a, 322b. Pylon assembly 322a is rotatable relative to wing 320 between a generally horizontal orientation, as best viewed in FIG. 3A, and a generally vertical orientation, as best viewed in FIG. 3B. Pylon assembly 322a includes a rotatable portion of the drive system and a proprotor assembly 324a that is rotatable responsive to torque and rotational energy provided by an engine or motor of the drive system. Likewise, pylon assembly 322b is rotatable relative to wing 320 between a generally horizontal orientation, as best viewed in FIG. 3A, and a generally vertical orientation, as best viewed in FIG. 3B. Pylon assembly 322b includes a rotatable portion of the drive system and a proprotor assembly 324b that is rotatable responsive to torque and rotational energy provided by an engine or motor of the drive system. In the illustrated embodiment, proprotor assemblies 324a, 324b each include three proprotor blade assemblies 326. It should be understood by those having ordinary skill in the art, however, that proprotor assemblies 324a, 324b could alternatively have a different number of proprotor blade assemblies, either less than or greater than three. In addition, it should be understood that the position of pylon assemblies 322a, 322b, the angular velocity or revolutions per minute (RPM) of proprotor assemblies 324a, 324b, the pitch of proprotor blade assemblies 326 and the like may be controlled by the pilot of tiltrotor aircraft 301 and/or a flight control system to selectively control the direction, thrust and lift of tiltrotor aircraft 301 during flight.

FIG. 3A illustrates tiltrotor aircraft 301 in a forward flight mode or airplane flight mode, in which proprotor assemblies 324a, 324b are positioned to rotate in a substantially vertical plane and provide a forward thrust while a lifting force is supplied by wing 320 such that tiltrotor aircraft 301 flies much like a conventional propeller driven aircraft. FIG. 3B illustrates tiltrotor aircraft 301 in a vertical takeoff and landing (VTOL) flight mode or helicopter flight mode, in which proprotor assemblies 324a, 324b are positioned to rotate in a substantially horizontal plane and provide a vertical thrust such that tiltrotor aircraft 301 flies much like a conventional helicopter. During operation, tiltrotor aircraft 301 may convert from helicopter flight mode to airplane flight mode following vertical takeoff and/or hover. Likewise, tiltrotor aircraft 301 may convert back to helicopter flight mode from airplane flight mode for hover and/or vertical landing. In addition, tiltrotor aircraft 301 can perform certain flight maneuvers with proprotor assemblies 324a, 324b positioned between airplane flight mode and helicopter flight mode, which can be referred to as conversion flight mode.

Wing 320 and pylon assemblies 322a, 322b form part of a propulsion and lift system 328 for tiltrotor aircraft 301. Fuselage 312 may include a drive system, including an engine, motor and/or transmission, for providing torque and rotational energy to each proprotor assembly 324a, 324b via one or more drive shafts located in wing 320. In other embodiments, each pylon assembly 322a, 322b houses a drive system, such as an engine, motor and/or transmission, for supplying torque and rotational energy to a respective proprotor assembly 324a, 324b. In such embodiments, the drive systems of each pylon assembly 322a, 322b, may be coupled together via one or more drive shafts located in wing 320 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Example embodiments associated with a passive gust alleviation system are described below with more particular reference to the remaining FIGURES. It should be appreciated that the rotorcraft 100 of FIGS. 1A-1B, tiltrotor aircraft 200 of FIG. 2, and tiltrotor aircraft 301 of FIGS. 3A-3B are merely illustrative of a variety of aircraft that can be used to implement embodiments of the present disclosure described and illustrated herein. Other aircraft implementations can include, for example, fixed wing airplanes, hybrid aircraft, unmanned aircraft, gyrocopters, a variety of helicopter configurations, and drones, among other examples. The FIGURES and the corresponding descriptions are applicable to any type of aircraft. Moreover, it should be appreciated that even though aircraft are particularly well suited to implement embodiments of the present disclosure, the described embodiments can also be implemented using non-aircraft vehicles and devices.

Figure 4A:
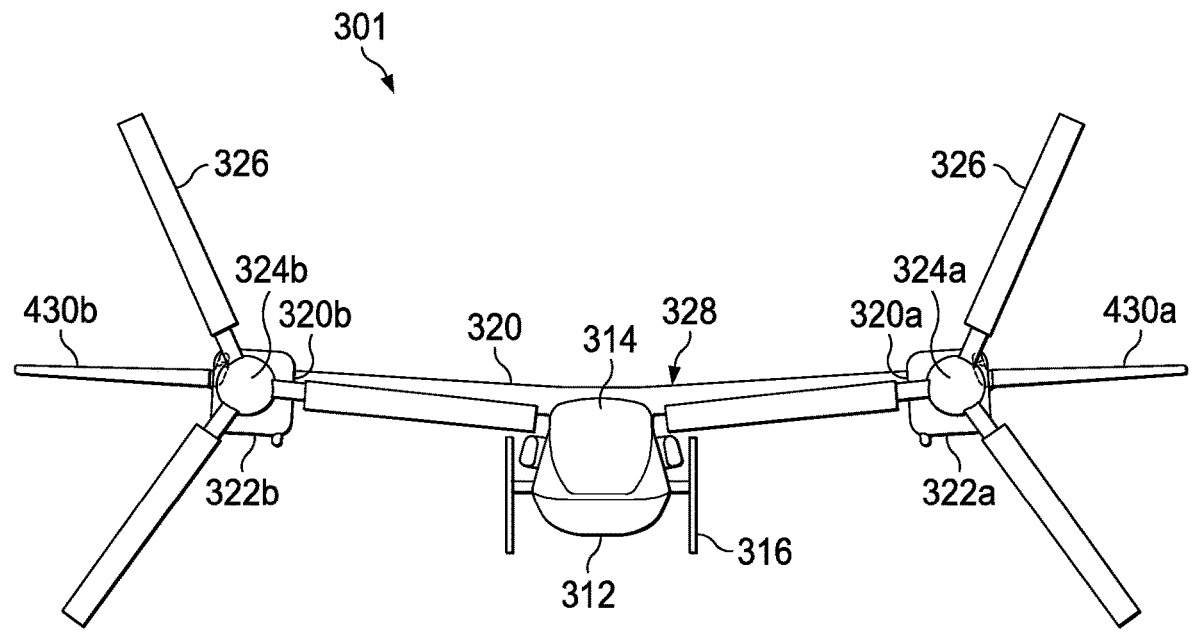
FIGS. 4A-4B are schematic illustrations of a tiltrotor aircraft in a flight mode and a storage mode in accordance with certain embodiments of the present disclosure.
Figure 4B:
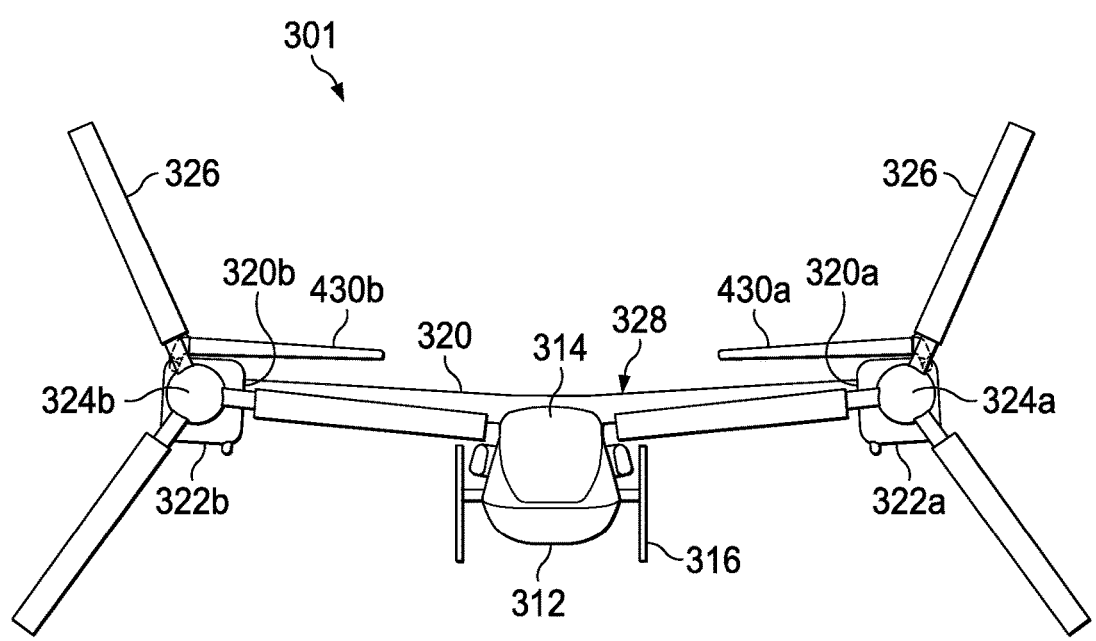

Referring to FIGS. 4A and 4B, tiltrotor aircraft 301 includes wing extensions 430a, 430b, which may be fixedly or rotatably coupled to the outboard ends of pylon assemblies 322a, 322b, respectively. Wing extensions 430a, 430b may be any length relative to wing 320. In one example, the length of each wing extension 430a, 430b may be between 20 to 45 percent of the length of wing 320. In a more specific non-limiting example, the length of each wing extension 430a, 430b may be between 35 to 40 percent of the length of wing 320. FIG. 4A shows tiltrotor aircraft 301 in flight mode, in which wing extensions 430a, 430b are in a flight position. FIG. 4B shows tiltrotor aircraft 301 in storage mode, in which wing extensions 430a, 430b are foldable and are folded into a stow position. In the flight mode shown in FIG. 4A, wing extensions 430a, 430b are extended outboard, away from fuselage 312, to increase the wingspan of tiltrotor aircraft 301 during flight. When wing extensions 430a, 430b are in the flight position, wing 320 and wing extensions 430a, 430b form a plane that provides lift for tiltrotor aircraft 301. In particular, wing 320 and wing extensions 430a, 430b form a substantially horizontal plane, which encompasses anhedral or dihedral wing or wing extension configurations. Wing extensions 430a, 430b provide an increased wingspan for tiltrotor aircraft 301 in flight mode, thereby increasing the efficiency of tiltrotor aircraft 301 in flight.

In the storage mode of tiltrotor aircraft 301 shown in FIG. 4B, wing extensions 430a, 430b are in the stow position. In particular, wing extensions 430a, 430b are rotated, or folded, inboard toward fuselage 312, thereby reducing the wingspan of tiltrotor aircraft 301. In the illustrated embodiment, wing extensions 430a, 430b each have an angular range of motion of approximately 180 degrees between the flight position shown in FIG. 4A and the stow position shown in FIG. 4B. Wing extensions 430a, 430b, however, may have any angular range of motion between the flight and stow positions, including angular ranges of motion approximately equal to or greater than 45, 60, 90, 120, 150 or 180 degrees. Wing extensions 430a, 430b fold over the top of pylon assemblies 322a, 322b and portions of wing 320 in the stow position. In other embodiments, wing extensions 430a, 430b may fold over only pylon assemblies 322a, 322b in the stow position. In yet other embodiments, wing extensions 430a, 430b may fold underneath pylon assemblies 322a, 322b, or in the forward or aft direction. As shown in FIG. 4B, wing extensions 430a, 430b are substantially parallel with wing 320 when wing extensions 430a, 430b are in the stow position, although in other embodiments wing extensions 430a, 430b may be nonparallel with wing 320 while in the stow position. Folding wing extensions 430a, 430b inboard in the storage mode lowers the storage footprint of tiltrotor aircraft 301, thereby conserving the amount of storage space required by tiltrotor aircraft 301 in spatially limited facilities, such as aircraft carriers and hangers. While wing extensions 430a, 430b are shown to be in the stow position while tiltrotor aircraft 301 is in forward flight mode, it will be appreciated by one of ordinary skill in the art that wing extensions 430a, 430b may also be in the stow position while tiltrotor aircraft 301 is in the VTOL flight mode shown in FIG. 3B. In other embodiments, foldable wing extensions 430a, 430b may be mounted onto fixed, or non-rotatable, pylons of tiltrotor aircraft.

It should be appreciated that tiltrotor rotorcraft 301 is merely illustrative of a variety of aircraft that can implement the embodiments disclosed herein. Indeed, foldable or fixed wing extensions 430a, 430b may be utilized on any winged aircraft. Other aircraft implementations can include hybrid aircraft, compound aircraft, tiltwing aircraft, quad tiltrotor aircraft, helicopters, jets, propeller airplanes and the like. As such, those skilled in the art will recognize that any number of wing extensions 430a, 430b disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 5A:
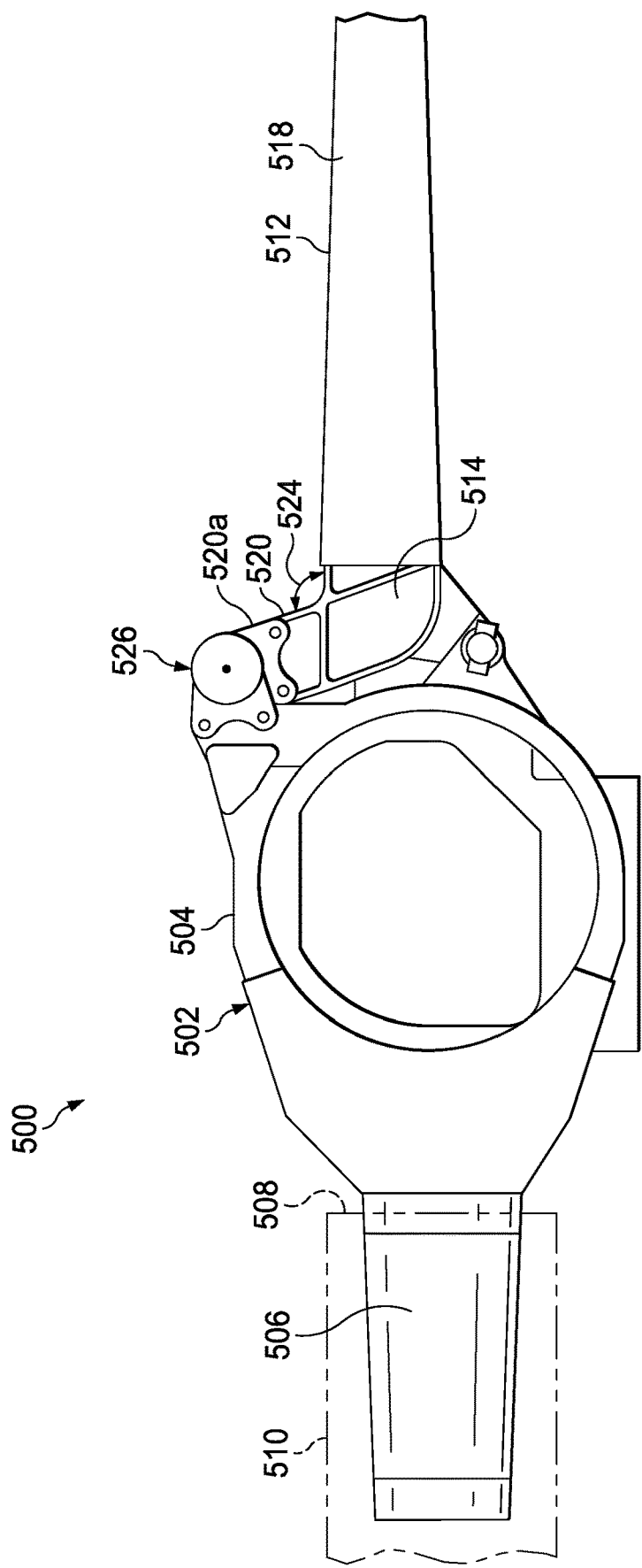
FIGS. 5A-5C are various views of a foldable wing extension in a flight position in accordance with certain embodiments of the present disclosure.
Figure 5B:
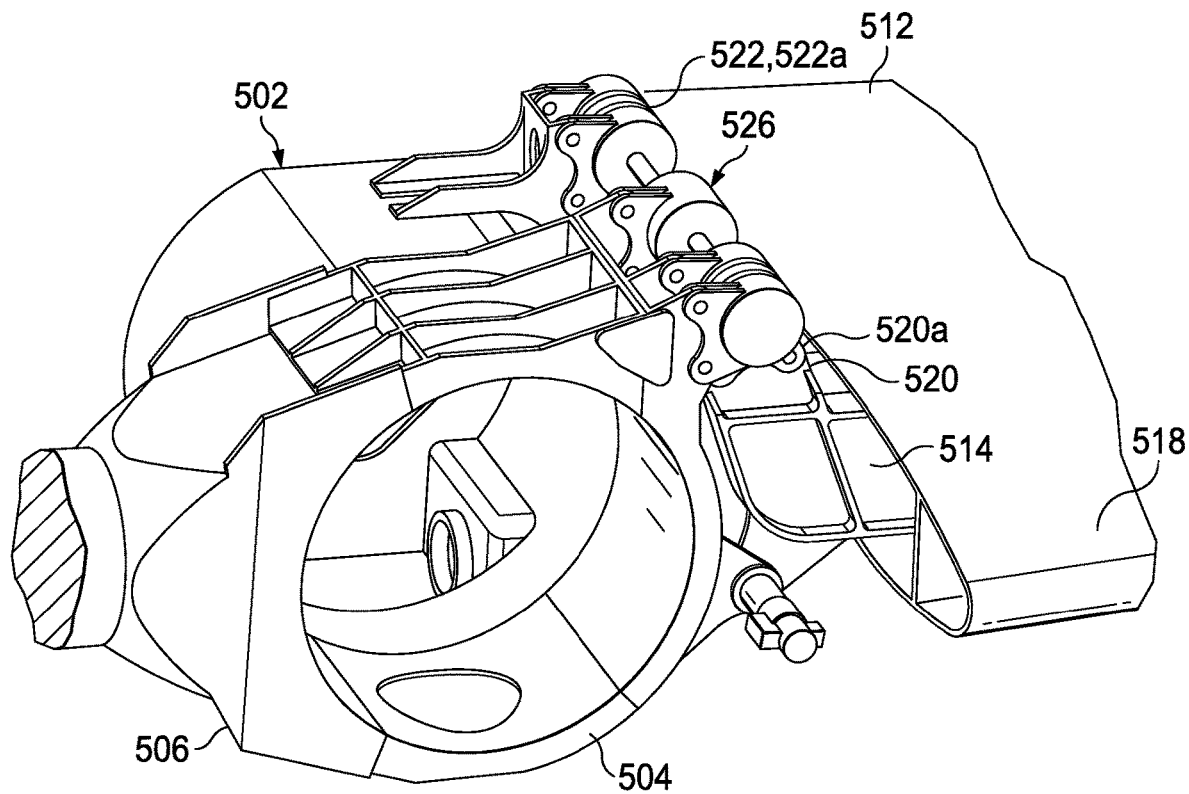
Figure 5C:
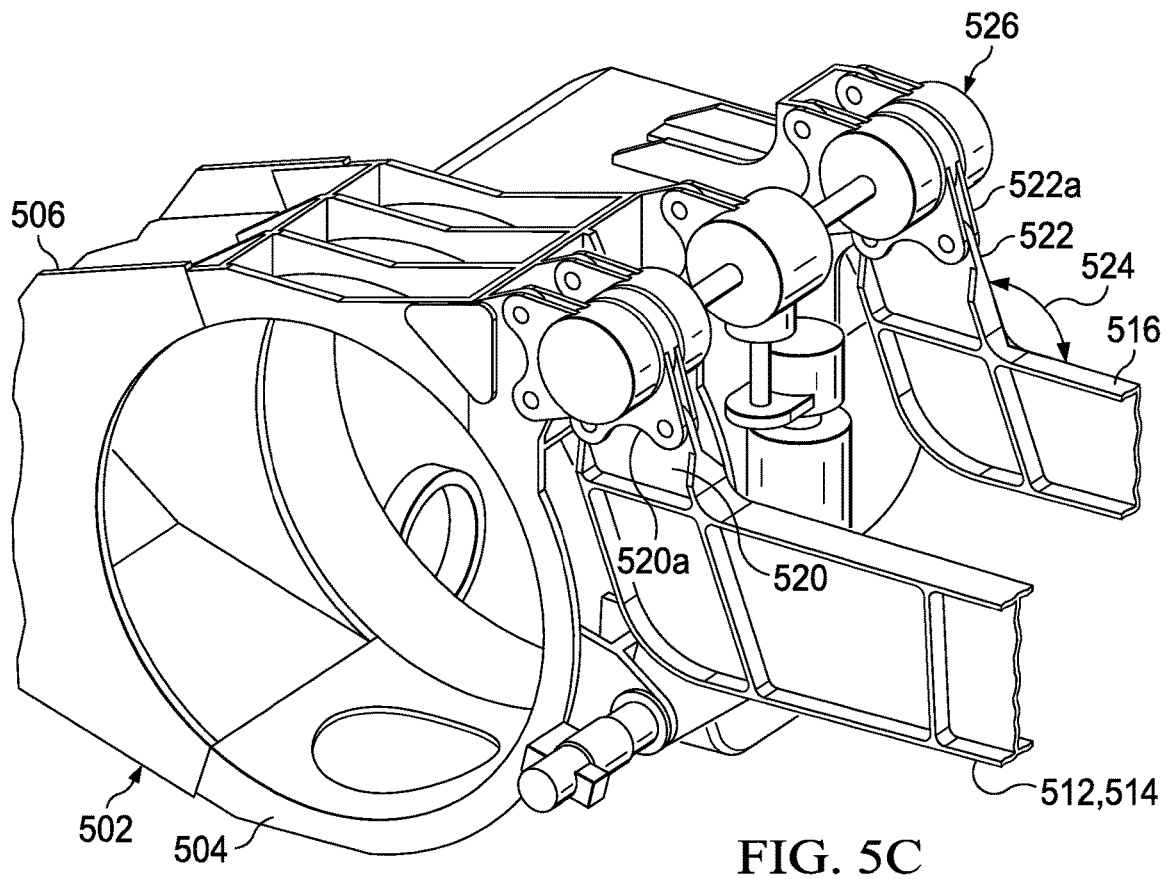

Referring to FIGS. 5A-5C, a propulsion and lift system for a tiltrotor aircraft is schematically illustrated therein and generally designated 500. Propulsion and lift system 500 includes pylon assembly 502. Pylon assembly 502 includes a pylon support 504 and a spindle 506. Spindle 506 is insertable into outboard end 508 of wing 510 such that pylon assembly 502 is rotatable relative to wing 510, as described above. For ease of reference, pylon assembly 502 is illustrated without a proprotor. In the embodiment shown in FIGS. 5A-5C, wing extension 512 is rotatably coupled to the outboard end of pylon support 504. A pylon assembly and wing extension substantially similar to pylon assembly 502 and wing extension 512 may be rotatably coupled to the opposite end of wing 510. For the sake of efficiency, certain features will be disclosed only with respect to pylon assembly 502 and wing extension 512. One having ordinary skill in the art, however, will fully appreciate an understanding of the other pylon assemblies and wing extensions on the tiltrotor aircraft based on the disclosure herein of pylon assembly 502 and wing extension 512.

Wing extension 512 includes a forward spar 514 and an aft spar 516. In other embodiments, wing extension 512 may include any number of spars or support structures, including a single spar. Wing extension 512 also includes a skin 518 substantially covering forward and aft spars 514, 516. The proximal ends of forward and aft spars 514, 516 each form a spar hinge fitting 520, 522 including a lug extension 520a, 522a, respectively. Spar hinge fittings 520, 522 each form a leg. Each leg forms an angle 524 with the outboard portion of a respective one of forward and aft spars 514, 516. Spar hinge fittings 520, 522 are illustrated as forming an obtuse angle 524 with forward and aft spars 514, 516, respectively. In other embodiments, angle 524 may be an acute angle or any angle less than 180 degrees.

In certain embodiments in which wing extension 512 is rotatable, wing extension is rotatably coupled to the outboard end of pylon support 504 about a hinge assembly 526. Hinge assembly 526 may be formed of revolute joints, as shown in FIGS. 5A-5C, or may be formed from other joint types, such as a ball and socket joint, pivot joint, saddle joint or universal joint, as well as others.

It should be appreciated that rotorcraft 101 of FIG. 1, tiltrotor aircraft 201 of FIG. 2, and tiltrotor aircraft 301 of FIG. 3 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Figure 6:
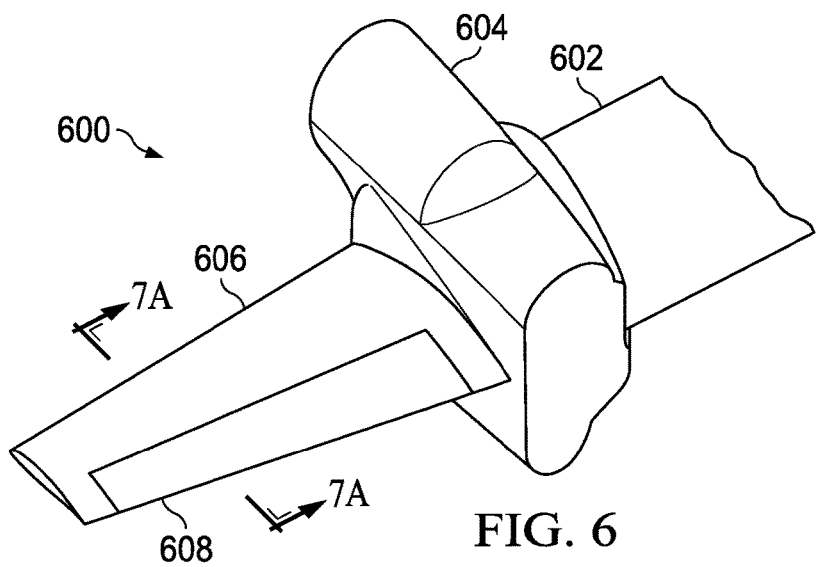
FIG. 6 illustrates a portion of an aircraft wing in which a gust alleviation system in accordance with certain embodiments of the present disclosure may be advantageously implemented.

FIG. 6 illustrates a portion of a tiltrotor aircraft wing assembly 600 which includes primary portion 602, a pylon 604, and a wing extension 606. In accordance with features of embodiments described herein, the wing extension 606 includes an aerodynamic surface 608 on a trailing edge thereof for controlling aircraft roll and/or lift. In the embodiment illustrated in FIG. 6, the aerodynamic surface 608 is implemented as a flap or aileron (or a flaperon), but it will be recognized that techniques described herein may be advantageously implemented with other aerodynamic surface configurations, such as a spoiler, for example, as well.

Figure 7A:
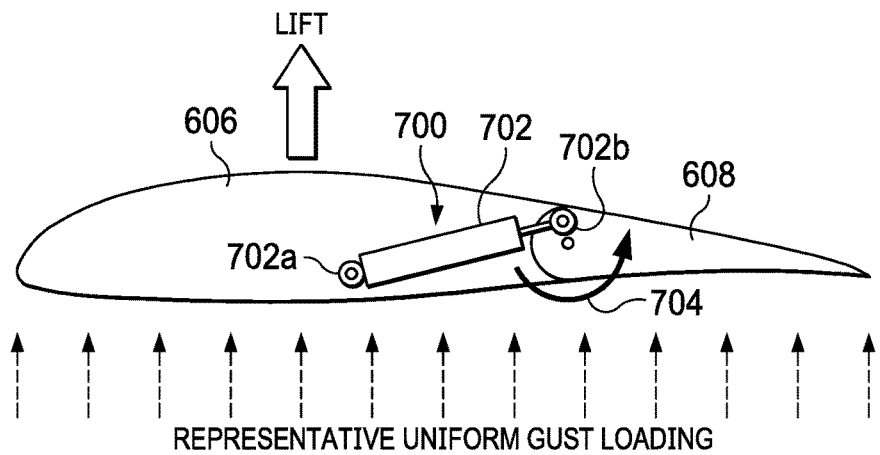
FIGS. 7A-7B illustrate details of a gust alleviation system in accordance with certain embodiments of the present disclosure.
Figure 7B:
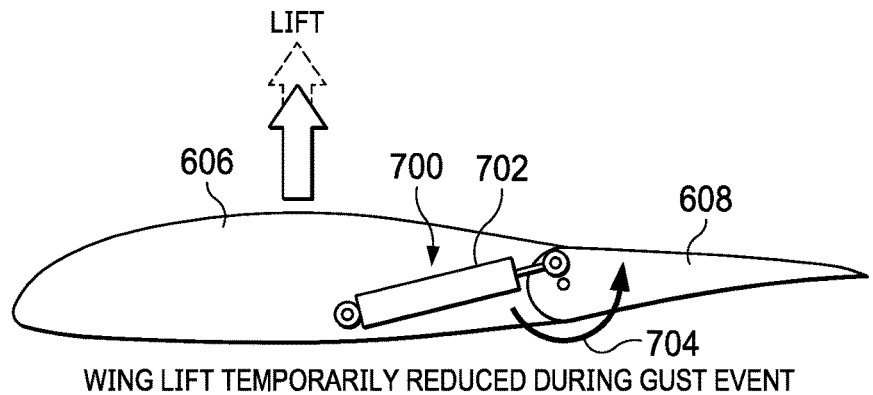

Referring now to FIGS. 7A-7B, illustrated therein are cutaway views of the wing extension 606 and associated aerodynamic surface 608 along a line A-A of FIG. 6. As shown in FIGS. 7A-7B, a hydraulic or pneumatic piston assembly, represented in FIGS. 7A-7B by a piston assembly 700, is connected at a first end 702a to an interior surface of the wing extension 604 and at a second end 702b to an interior surface of the moveable trailing edge surface 608 by a simple bolted joint connection (lug/clevis), for example. In operation, the piston assembly 700 holds the trailing edge aerodynamic surface 608 against a mechanical stop feature in a nominal location at a constant supply pressure, as best illustrated in FIG. 7A. As a temporary upward gust is encountered, the moveable trailing edge is loaded upward, causing cylinder pressure of the piston assembly 700 to increase until a pressure relief valve 702 opens at a certain threshold, as illustrated in FIG. 7B. The threshold pressure for opening the piston assembly relief valve may be set at an appropriate value to limit the amount of lift load reacted by the airframe. Generally, this maximum lift would occur at the aircraft's highest forward airspeed (generating the highest hinge moments about the trailing edge surface). Continuing to refer to FIG. 7B, with the relief valve 702 open, the trailing edge aerodynamic surface 606 can rotate upward, in a direction indicated by an arrow 704, reducing wing lift below a lift load threshold. For example, if the wing extension generates 1000 pounds of lift during maximum speed flight and an upward gust causes an additional 500 pounds of upward load, the gust alleviation device described herein would allow for structural sizing of the wing to loads less than the combined effect of these two conditions (i.e., 1500 pounds). Using those example numbers, the wing could be designed to carry 1100 pounds of lift load, for example, thereby yielding a lighter structure than a wing that was sized for 1500 lift load. As a result, bending moment in the wing structure, pylon spindle, and wing root (i.e., the center section of the wing and where the wing attaches to the fuselage) attachment is limited, thereby reducing weight. Reducing gust loads experienced by the wing also reduces lift loads imparted to the fuselage.

Hysteresis inherent in the operation of the pressure relief valve 702 allows sufficient time for a gust event to subside, cylinder pressure to subside to below the threshold, and the trailing edge aerodynamic surface to return to a normal position (FIG. 7A). The passive gust alleviation system shown and described in detail with reference to FIGS. 7A-7B is much simpler than a traditional actuator plus sensor feedback gust alleviation system. Also, although shown as being implemented on the wing extension, it will be recognized that the gust alleviation system may also be advantageously implemented in connection with trailing edge aerodynamic surfaces on the primary wing, for example.

Figure 8A:
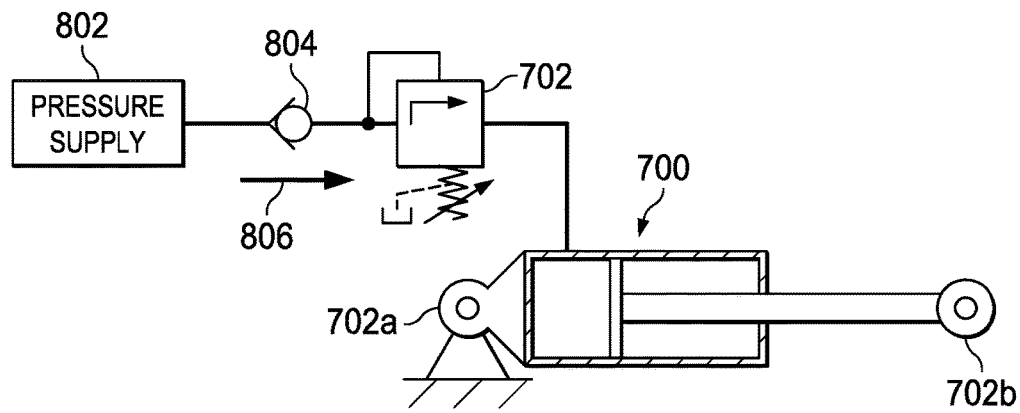
FIG. 8A is a more detailed schematic diagram of a piston system for use in implementing a gust alleviation system in accordance with certain embodiments of the present disclosure.

FIG. 8A is a more detailed schematic diagram of a piston assembly, such as the piston assembly 700 of FIGS. 7A and 7B. As shown in FIG. 8A, the piston assembly 700 is connected to the airframe at the first end 702a and to the trailing edge surface at the second end 702b. A pressure supply 802 is connected to the relief valve y02 via a check valve 804, which only allows airflow in a direction indicated by an arrow 806. A more detailed schematic diagram of an example embodiment of a conventional spring-loaded pressure relief valve 810 that may be used in implementing the relief valve 702 is illustrated in FIG. 8B.

Figure 8B:
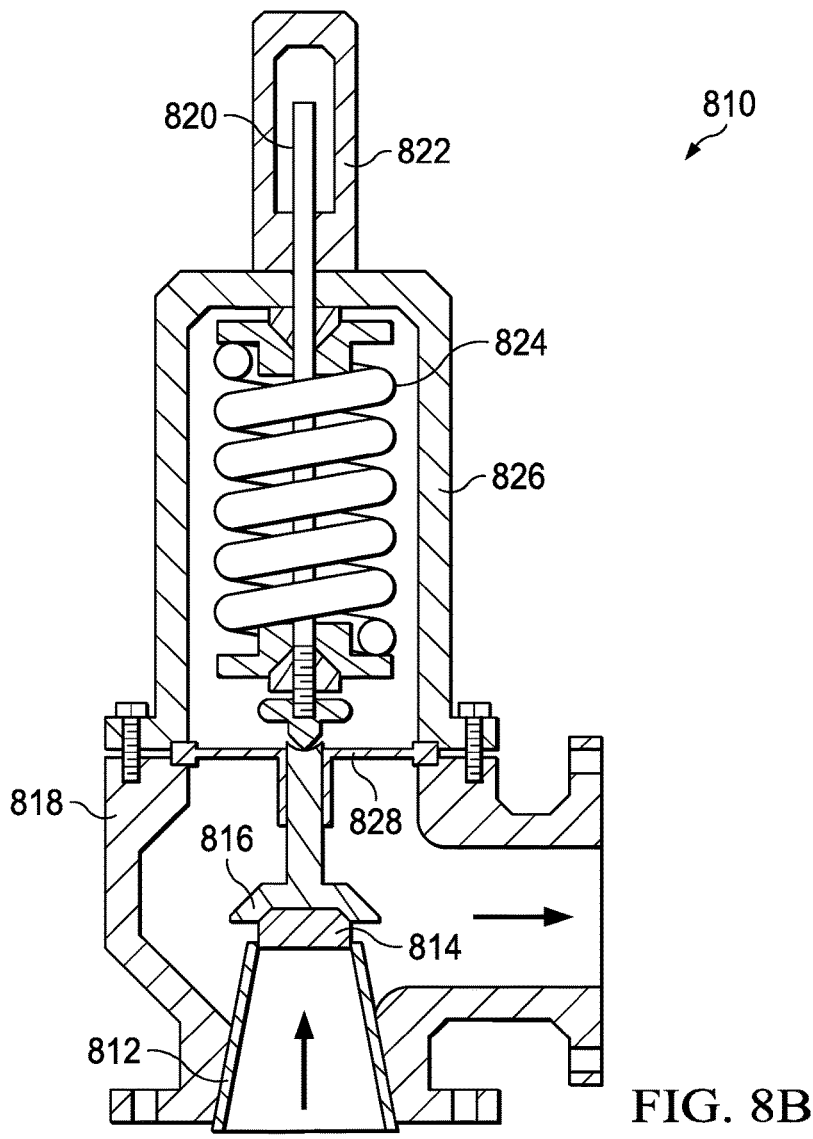
FIG. 8B is a more detailed schematic diagram of an example embodiment of a relief valve for use in implementing a gust alleviation system in accordance with certain embodiments of the present disclosure.

As shown in FIG. 8B, the pressure relief valve 810 may include an inlet nozzle 812, a valve seat 814, a seat holder 816, a valve body 818, a set pressure adjusting screw 820, a cap 822, a spring 824, a bonnet 826, and a seal 828.

The embodiments described throughout this disclosure provide numerous technical advantages, including by way of example, the ability to alleviate loads caused by intermittent wind guests in a passive manner and without requiring electronic actuators, control signals, and feedback loops, as required in more complicated and complex wing gust alleviation systems.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. An apparatus comprising:
   an aircraft wing; and
   a trailing edge aerodynamic surface connected to a trailing edge of the aircraft wing via a piston assembly;
   wherein the piston assembly holds the trailing edge aerodynamic surface in a neutral position relative to the aircraft wing at a constant supply pressure;
   wherein the piston assembly includes a pressure relief valve configured to open responsive to a lift load exerted on the wing exceeding a first threshold; and
   wherein opening of the pressure relief valve allows the trailing edge aerodynamic surface to rotate from the neutral position upward relative to the aircraft wing.

2. The apparatus of claim 1, wherein the piston assembly comprises at least one of a pneumatic piston assembly and a hydraulic piston assembly.

3. The apparatus of claim 1, wherein a first end of the piston assembly is connected to the aircraft wing and a second end of the piston assembly is connected to the trailing edge aerodynamic surface.

4. The apparatus of claim 1, wherein upward rotation of the trailing edge aerodynamic surface relative to the aircraft wing reduces the lift load exerted on the wing.

5. The apparatus of claim 1, wherein the pressure relief valve is configured to close responsive to the lift load exerted on the wing falling below the first threshold.

6. The apparatus of claim 5, wherein closing of the pressure relief valve causes the trailing edge aerodynamic surface to rotate downward relative to the aircraft wing toward the neutral position.

7. A rotorcraft comprising:
   an aircraft wing; and
   a trailing edge aerodynamic surface connected to a trailing edge of the aircraft wing via a piston assembly;
   wherein the piston assembly holds the trailing edge aerodynamic surface in a neutral position relative to the aircraft wing at a constant supply pressure;
   wherein the piston assembly includes a pressure relief valve configured to open responsive to a lift load exerted on the wing exceeding a first threshold; and
   wherein opening of the pressure relief valve allows the trailing edge aerodynamic surface to rotate from the neutral position upward relative to the aircraft wing.

8. The rotorcraft of claim 7, wherein the piston assembly comprises at least one of a pneumatic piston assembly and a hydraulic piston assembly.

9. The rotorcraft of claim 7, wherein a first end of the piston assembly is connected to the aircraft wing and a second end of the piston assembly is connected to the trailing edge aerodynamic surface.

10. The rotorcraft of claim 7, wherein upward rotation of the trailing edge aerodynamic surface relative to the aircraft wing reduces the lift load exerted on the wing.

11. The rotorcraft of claim 7, wherein the pressure relief valve is configured to close responsive to the lift load exerted on the wing falling below the first threshold.

12. The rotorcraft of claim 11, wherein closing of the pressure relief valve causes the trailing edge aerodynamic surface to rotate downward relative to the aircraft wing toward the neutral position.

13. An aircraft wing comprising:
- a trailing edge aerodynamic surface connected to a trailing edge of the aircraft wing via a piston assembly;
- wherein the piston assembly holds the trailing edge aerodynamic surface in a neutral position relative to the aircraft wing at a constant supply pressure and wherein the piston assembly includes a pressure relief valve;
- wherein the pressure relief valve is configured to open responsive to a lift load exerted on the wing exceeding a first threshold, the opening of the pressure relief valve allowing the trailing edge aerodynamic surface to rotate from the neutral position upward relative to the aircraft wing; and
- wherein the pressure relief valve is configured to close responsive to the lift load exerted on the wing falling below the first threshold, the closing of the pressure relief valve causing the trailing edge aerodynamic surface to rotate downward relative to the aircraft wing toward the neutral position.

* * * * *